United States Patent Office 2,838,133
Patented June 10, 1958

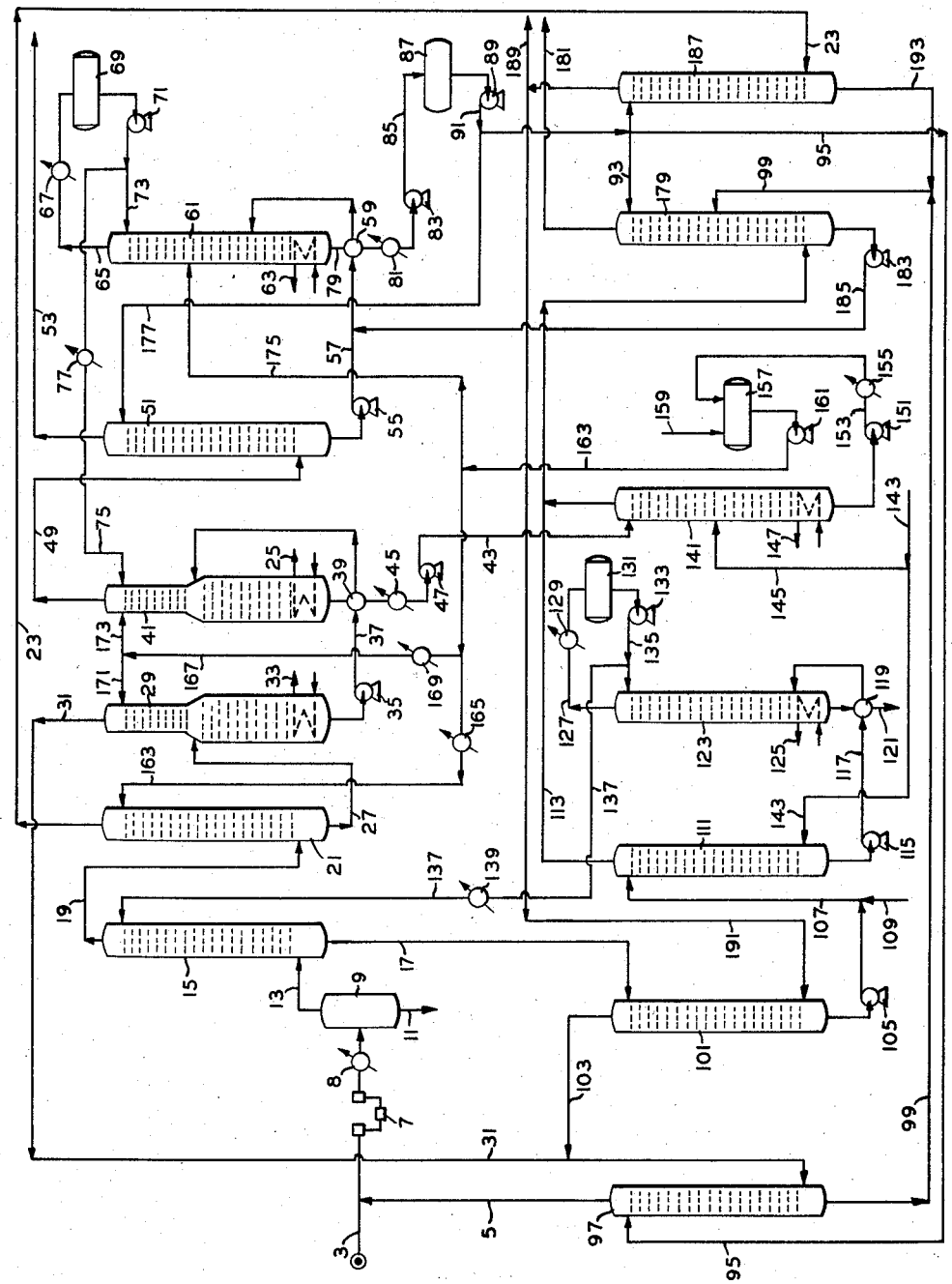

2,838,133

PURIFICATION OF ACETYLENE

Warren C. Schreiner, Franklin Square, N. Y., assignor to The M. W. Kellogg Company, Jersey City, N. J., a corporation of Delaware Application June 22, 1955, Serial No. 517,289

11 Claims. (Cl. 183—115)

This invention relates to a process for the production of acetylene and more particularly to the treatment of the gaseous effluent from such a process. Still more particularly it relates to a method of treating the product gases from the pyrolysis of hydrocarbons to acetylene to remove polymerizible impurities from the gaseous mixture. The invention is particularly applicable to the separation of acetylene homologues from acetylene.

The primary starting materials for the production of acetylene today are obtained from petroleum, and in particular the lower boiling constituents thereof, namely the normally gaseous hydrocarbons. In a conventional acetylene process, a hydrocarbon feed is pyrolyzed under closely controlled process conditions to provide a mixture of gaseous reaction product rich in acetylene. Unfortunately, the thermodynamics of the acetylene process are such that in addition to acetylene a number of side products are produced, and in substantial quantities. The more usual compounds formed along with acetylene are low boiling olefins such as ethylene and more highly unsaturated compounds of the acetylene family, such as for example methyl-acetylene, monovinyl acetylene and diacetylene. The acetylene reaction is promoted by elevated temperatures and is endothermic in nature. Usually part of the heat required to maintain the reaction is supplied by preheating the hydrocarbon feed and the remainder is provided by introducing oxygen into the reaction zone for combustion with a portion of said feed. As a result, the effluent gases from the reaction zone are contaminated with large quantities of combustion products, essentially a mixture of carbon monoxide and carbon dioxide. In addition to the aforementioned compounds, the reaction product gas also contains unconverted hydrocarbon feed and large amounts of hydrogen which is released in the dehydrogenation reactions which predominate in this process. The relative quantities of the various components which go to make the reaction product will vary depending on the feed material and the conditions under which the pyrolysis reaction is carried out. In general, however, the combustion gases are largest in quantity, followed by acetylene, hydrogen, unconverted feed, acetylene homologues, etc., not necessarily in the order given. The possible uses of a gas of such a heterogeneous nature are very few, therefore, a large part of an acetylene unit is devoted to the handling and separation of the various gases mentioned.

Because of their generally unsaturated nature, some of the reaction products are not too stable and it is necessary to observe strict safety precautions when treating and separating them from the gaseous reaction product. It is well known, for example, that acetylene and its homologues are very unstable and may decompose spontaneously and with explosive violence. Also, under certain conditions the more highly unsaturated acetylenic compounds, namely diacetylene and monovinyl acetylene react to form heavy polymers which are also very unstable. It is necessary, therefore, in handling the acetylene product gases to provide suitable conditions which will minimize polymerization of the acetylene homologues and provide a safe and effective separation process.

It is an object of this invention to provide an improved process for the preparation of acetylene from hydrocarbons.

It is another object of this invention to provide an improved method for separating acetylene homologues from a mixture of gases produced in the pyrolysis of hydrocarbons.

Still another object of this invention is to prevent polymerization of acetylenic compounds during the recovery of acetylene and its homologues from gases produced in the pyrolysis of hydrocarbons.

Another object of the invention is to provide an improved method of separating acetylene homologues from a gaseous mixture containing acetylene, homologues of acetylene and other gaseous hydrocarbons and inert gases.

These and other objects of the invention will become more apparent from the following detailed description and discussion.

In the method of this invention the above objects are realized by contacting product gases from the pyrolysis of hydrocarbons with a liquid solvent to absorb therefrom acetylene homologues and a minor proportion of the acetylene in said gases. The absorbent liquid is passed into a first stripping zone wherein it is contacted with an inert gas to remove the absorbed acetylene. The liquid from this zone which is rich in acetylene homologues is further stripped in the presence of water with an inert gas to remove said homologues. The absorbent is returned to the absorption zone after a separation treatment which serves to remove the major part of the water introduced in the second stripping step.

The pyrolysis of hydrocarbons to produce acetylene is carried out at elevated temperatures, more usually between about 2000° F. and about 3000° F. Because of the high reaction temperature required and the endothermic nature of the reactions which take place it is necessary to provide a large amount of thermal energy in order to maintain the process. Part of the sensible and reaction heat required may be obtained by preheating the hydrocarbon feed; unfortunately, however, the preheat temperature must be limited to a level substantially lower than the reaction temperature in order to avoid premature reaction. A preferred method of supplying the additional thermal energy required is by partial combustion of the hydrocarbon feed with oxygen. This provides a combustion flame in which the temperature quickly reaches the high level required for pyrolysis, and the hydrocarbon is readily converted to the more unsaturated acetylene.

As a general rule, the pyrolysis reaction proceeds more quickly and with higher yields as the reaction temperature is increased. However, subjecting reactants to higher temperatures over any extended period of time tends to produce undesirable reactions and thereby increases the proportion of undesirable side products. Therefore, the preferred process is one in which the temperature is maintained at a high level and the reaction time is held to a minimum. When oxygen or an oxygen containing gas such as air is utilized to supply the thermal requirements of the process, the required ratio of oxygen to hydrocarbon reactant is between about 0.45 and about 0.60 mols per mol, the exact quantity needed dependent on the type of reactant and the reactant temperature. Usually pure oxygen is preferred in this operation since the use of air or a similar oxygen containing material introduces compounds which dilute the hydrocarbon feed and the effluent from the reaction zone. Pressure has two effects on the pyrolysis reaction: (1) It increases the temperature at which the reaction proceeds and (2) it increases the density of the reactant gases thus increasing the time in the reaction zone, which makes it necessary to maintain a higher gas velocity therein. It is preferable, therefore, to maintain as low a pressure as possible in the reaction zone; however, if desired, pressures ranging from a few to several hundred atmospheres are used. As mentioned before, it is preferred to limit the residence time of the reactants in the recation zone and reaction times as low as about 0.005 second are not unusual. A degree of latitude in reaction time exists for each specific process, the optimum value in each case depending primarily on the temperature selected for carrying out the reaction and the type of feed material used. More usual reaction times under preferred operating conditions are on the order of seconds or fractions of a second.

Many types of hydrocarbons are pyrolyzed to produce acetylene including paraffins, olefins, aromatics, naphthalenes, etc. Because of their greater availability, particularly in petroleum refinery gases, the lower boiling aliphatic hydrocarbons such as methane, ethane, ethylene, propane, propylene, etc., find frequent use in the pyrolysis process.

Although the pyrolysis reaction conditions are controlled as closely as possible, the conversion product gases invariably contain a quantity of undesirable unsaturated compounds which must be separated from the acetylene product. In addition, as previously mentioned, unconverted hydrocarbon feed, combustion gases and hydrogen produced in the process must also be separated from the acetylene product. Typical of a product composition resulting from the pyrolysis reaction is the mixture presented in Table 1, which was obtained from the conversion of methane.

TABLE 1

| Component: | Mol percent |
|---|---|
| $C_2H_2$ | 9.76 |
| $CH_4$ | 5.73 |
| $C_2H_4$ | 0.29 |
| $C_3H_4$ | 0.14 |
| $C_4H_2$ | 0.34 |
| $C_4H_4$ | 0.05 |
| $CO_2$ | 2.36 |
| $O_2$ | 0.35 |
| $CO$ | 23.05 |
| $N_2$ | 0.14 |
| $H_2$ | 57.79 |
| | 100.00 |

When processing a gas of the composition of Table 1, considerable difficulty is encountered in separating acetylene from its homologues. As mentioned before, these highly unsaturated compounds are unstable and will decompose under certain conditions. One of the conditions which promotes this undesirable result is elevated temperature. Because of this, although the various homologues and acetylene have different boiling points, it is not possible to effect their separation by distillation because of the temperatures required. In addition, elevated temperatures tend to promote polymerization of the acetylene homologues and in particular the more unsaturated compounds, with the undesirable effects previously described. It has been found that in addition to the effect of temperature, the instability of the acetylenic compounds is also affected by their concentration, with the probability of decomposition increasing as the concentration of these materials becomes greater. As a result the various separation steps involved in the treatment of the reaction product gases preferably are carried out at low temperatures whereby polymerization is suppressed and also in such a manner as to maintain the concentration of acetylenic compounds at a reduced level in all parts of the system.

In carrying out the process of this invention, it is desirable before attempting to separate the various unsaturated materials to first subject the reaction product gases to a preliminary two-stage treatment for the removal of hydrogen, unconverted hydrocarbon feed and combustion gases. This is effected by absorbing the acetylenic compounds from the reaction product gases in a suitable liquid absorbent. Preferably, the first stage of this operation is carried out in such a manner that a maximum of acetylene homologues is absorbed and a minimum of acetylene, in order to simplify the subsequent separation steps. The gases which remain are further treated in the second stage in a second absorption zone to separate the inert materials and gaseous hydrocarbons from the remaining and major portion of the acetylene product. Also included in this phase of the recovery process is an operation to remove the small amount of acetylene homologues which are not picked up in the first absorption zone. The bottoms from the first asorption zone, that is the rich liquid absorbent, are subjected to a further treatment for the separation therefrom of the various acetylene compounds. This treatment comprises first stripping the absorbent with an inert gas to remove preferentially acetylene, then stripping the absorbent a second time in the presence of water also with an inert gas to remove the other acetylenic compounds.

There are a number of reasons and advantages in carrying out the treating process in the manner described. The primary separation of acetylenic compounds from the reaction gases serves to concentrate these materials in a relatively small amount of acetylene thereby substantially decreasing the quantity of liquid to be handled in the further treating steps which make up this phase of the recovery process. Acetylene being more volatile than its homologues is preferably removed from the absorbent by stripping, thus it is advantageous to remove this material in a separate preliminary stripping step. The second stripping step which completes the separation of the absorbed materials, that is the acetylene homologues, from the absorbent material is very important since it involves the addition of another component to the system, namely water. The desirability of carrying out the stripping operations at low temperatures has been pointed out in the previous discussion. Unfortunately, the ability of a gas to strip absorbed materials from a solvent is enhanced by increasing the temperature rather than by decreasing it. At the temperatures employed for stripping herein, the volatility of the acetylenic compounds other than acetylene is so low that stripping is not effective. It has been found that this problem can be overcome to a great extent by conducting the stripping operation in the presence of water. The solubility of the acetylene homologues in water as compared to their solubility in the absorbent solvent is very low and adding the water apparently increases the volatility of the homologues and allows their desorption with a minimum carry over of absorbent.

Solvents useful as absorbents in the system described are selected from a variety of classes of organic compounds such as for example the ketones, aldehydes, alkyl alcohol, polyhydric alcohols and ethers and esters thereof, amines, etc. Among specific examples of compounds suitable for this service are acetone, methyl-ethyl ketone, acetaldehyde, propanal, ethyl alcohol, iso and normal propyl alcohol, butyl alcohol, furfural, trimethyl and triethyl phosphate, the glycol ethers, including monoethyl, monomethyl and dimethyl, diethylene oxide, dimethyl, ethyl and diethyl formamides, glycol monoformate, diethylene and dipropylene glycol, diethylene glycol, monoacetate, cyclohexanone, pyrrolidone, dimethyl sulfoxide, butyrolacetone, etc. While any of the above are used within the scope of the invention, not all of them should be considered as equivalent, some being more effective than others. Particularly useful absorbents are acetone, dimethyl formamide and the glycol ethers. The beneficial effect derived from the use of any particular solvent will vary in degree with the composition of the reaction product gases, the amount of solvent used, the amount of water provided in the water stripping step and the temperature conditions maintained during absorption and stripping. The only limitation on the choice of a solvent is that it be selected from those having a high solubility in water and that the acetylene be more soluble in the solvent than in water.

In general, the process conditions under which the aforedescribed operations are made are controlled to provide a low temperature in the absorption and stripping zones, for the reasons previously given. It is desirable, usually, to conduct these steps at temperatures not exceeding about 200° F. and preferably between about 40° F. and about 100° F. The temperatures may be maintained substantially the same in each stage of the process or they may be varied from operation to operation. The absorption step is promoted by elevated pressures whereas the subsequent stripping operations are best carried out at low pressures. As a result, the gases leaving the reaction zone are preferably passed through a compression stage and elevated to a pressure between about 100 and about 300 p. s. i. g. prior to absorption and the absorbent liquid, containing acetylene and its homologues, is flashed to much lower pressures during the subsequent stripping operations. It is desirable to remove a maximum of the homologues and a minimum of acetylene in the first absorption step. Although it is not practicable to remove all of the acetylene homologues, it is necessary to remove at least a sufficient amount to prevent excessive concentrations, particularly of the more readily polymerized compounds, in the subsequent higher temperature recovery steps. The absorption operation, therefore, represents a compromise. More usually, the major portion that is between about 60 percent and about 90 percent of the homologues are removed by the absorbing liquid and they are accompanied by a quantity of acetylene which may amount to as much as about 25 percent of the total quantity of this material present in treated gases. To provide an effective absorption process requires the use of a (substantial) amount of absorbent usually between about 0.01 and about 0.10 mols per mol of treated gases and more preferably between about 0.02 and about 0.06 mols per mol. The amount of absorbent used in any particular process, of course, depends on several factors including the composition reaction product gases, the specific solvent used and the temperature and pressure at which absorption is effected. In carrying out the subsequent steps of the process, the absorbent is contacted with an inert stripping gas in order to selectively remove the absorbed materials. The gas used for the stripping process may be selected from among the conventional inert gases including, for example nitrogen, carbon monoxide, carbon dioxide, etc., and mixtures thereof. In the later discussion of a particular embodiment of the invention, reference is made to a tail gas which is one of the final products of the separation process and which contains the miscellaneous combustion gases, hydrogen and gaseous hydrocarbons. This and mixtures of a similar nature are also used for stripping within the scope of this invention.

The stripping operation is divided into two steps. The purpose of the first is to desorb acetylene without releasing from the absorbent any substantial quantity of the homologues contained therein. Since acetylene has the highest volatility of the several compounds present this may be accomplished by appropriately controlling the temperature, pressure and amount of inert stripping gas used in the operation. Normally the relative volatility of absorbed gases increases with decreasing pressure; therefore, it is preferred to carry out this operation at a low pressure, usually between about 5 and about 20 p. s. i. g. Another and more important reason for using low pressure is that it substantially reduces the amount of stripping gas required, since reducing the pressure automatically releases some gases from the absorbent. The amount of inert gas required in this portion of the process is relatively small, usually between about 0.5 and about 2.0 mols per mol of absorbed gases.

In the secondary stripping operation, the removal of absorbed material is more difficult and a substantially larger amount of stripping gas is needed, more usually between about 5 and about 20 mols per mol. To aid in the separation of the absorbed homologues, a quantity of water is added to the system. More usually, it is preferred to introduce the water into the absorbent before it enters the stripping zone; however, it is within the scope of the invention to separately introduce the two streams into the stripping zone. The introduction of any amount of water into the system provides a valuable effect and beneficial results are realized regardless of the relative quantity of this material present in the stripping zone. However, more usually a sufficient amount of water is admitted to provide a concentration in the stripping zone of between about 0.5 and about 10 mols per mol of absorbent, and more preferably between about 2 and about 8 mols per mol. The pressure maintained in the second stripping operation is somewhat less than that in the primary stripper, usually between 3 and about 15 p. s. i. g. It should be apparent, of course, that in both stripping operations and in the absorption step a suitable correlation of the process variables is necessary to provide optimum results.

As previously mentioned, it is not practicable to remove all of the homologues from the reaction product in the initial absorption step. Therefore, provision must be made for the removal of the remainder of these compounds in the subsequent treatment of the product gases. In addition, only a minor portion of the acetylene present in the reaction gases is removed therefrom in the primary absorption operation. The problem of separating the remaining and major proportion of the acetylene product still remains and this requires a number of additional processing steps. The function of the particular absorption and stripping operations described is to remove a sufficient quantity of the easily polymerizable materials, namely the acetylene homologues, to prevent the undesirable effects discussed earlier. The least desirable compound from the viewpoint of polymerization and unstability is diacetylene and, therefore, it is particularly desirable to remove this compound from the gaseous product. In the following detailed discussion, a specific embodiment of the invention is presented in which a product gas containing large amounts of diacetylene is treated. This, however, is not intended in any way to limit the scope of the invention, but is only presented as illustrative of a preferred embodiment thereof. Also covered in the detailed discussion are the steps employed for separating the remaining and major portion of the acetylene and the few remaining acetylene homologues from the gaseous reaction product.

Referring to the accompanying drawing which is a diagrammatic illustration of an acetylene recovery process, a gaseous reaction product from the high temperature pyrolysis of methane is introduced to the recovery unit through conduit 3. Before being compressed in preparation for the absorption step, this material is joined by a recycle gas rich in acetylene from the recycle gas water scrubber 97. The total gas which comprises a mixture of acetylene, methane, ethylene, methyl acetylene, monovinyl acetylene, diacetylene, carbon dioxide, carbon monoxide, nitrogen, hydrogen and some water vapor is increased in pressure to about 200 p. s. i. g. in compressor 7, passed through a cooler 8 to remove heat of compression and reduce the gas temperature to about 55° F. and is introduced into vessel 9. In this vessel, which serves as a knock-out drum, water condensed in the cooler is removed through conduit 11 and the remaining gases are passed through conduit 13 into the bottom of a diacetylene absorber 15. To effect the removal of the diacetylene and other acetylene homologues from the feed gas, acetone is introduced into the upper portion of the absorber and is passed downwardly therethrough countercurrent to the ascending gases. A sufficient amount of the absorbent is introduced to provide a ratio of this material to the total homologues present in the gases of about 10 pounds per pound. By carrying out the absorption operation at low temperature and high pressure, it is possible to provide an effective separation in which about 80 percent of the total acetylene homologues and almost the entire amount of diacetylene is removed from the gases entering the absorber. Similarly, close control of the absorber operating conditions makes it possible to operate with a minimum absorption of acetylene; in this particular example only about 6 percent of the total acetylene is absorbed from the gases. The rich absorbent is transferred from the bottom of the absorber 15 through conduit 17 and is introduced into the upper portion of acetylene stripper 101. The pressure on this vessel is substantially reduced, that is to about 10 p. s. i. g. which aids in the stripping operation and also serves to reduce the temperature in the stripper to about 45° F. This is not sufficient, however, to effect the desired desorption of acetylene and to aid in this process an inert gas, namely product tail gas from the tail gas water scrubber 187, is introduced to the bottom of the stripper through conduit 191. Acetylene being the most volatile unsaturated material absorbed in the acetone is preferentially released therefrom. The quantity of stripping tail gas required in this operation is relatively small, namely about 1 s. c. f. per pound of stripper feed. The overhead gas from 101 which comprises primarily acetylene and acetone with small amounts of the acetylene homologues is combined with the overhead from the reabsorber 29 and is passed into a recycle gas water scrubber 97. In this vessel the gases are scrubbed with water introduced through conduit 95 to remove acetone, which is transferred therefrom through conduit 99 and the remaining gases being rich in acetylene are combined with the product from the pyrolysis reaction through conduit 5 for recovery of this material.

The acetylene homologues which remain in the acetone liquid are somewhat less volatile than the acetylene and are, therefore, more difficult to remove. To aid in the separation of these compounds, it is necessary to introduce another component, namely water, into the system. The solubility relations between the homologues, the solvent and the water are such that the volatility of the homologues is greatly enhanced and their separation from the solvent is more readily obtained in the presence of this material. In this specific embodiment of the invention water, in an amount equal to about 2 pounds per pound of absorbent, is added to the absorbent prior to the introduction of the latter material into the diacetylene stripper 111. The combination of the two streams is effected at the junction of conduits 107 and 109, the water being introduced through the latter conduit and the absorbent being introduced from the bottom of the stripper through pump 105 into the former conduit.

In the specific embodiment of the process covered in this discussion the acetylene homologues are a mixture of a minor proportion of methyl acetylene and monovinyl acetylene and a major proportion of diacetylene. The unsaturated materials in the absorbent passing through conduit 107, therefore, consist primarily of diacetylene. This material is introduced into a stripper 111, which is designated as the diacetylene stripper, wherein it is contacted countercurrently with an inert stripping gas, namely nitrogen introduced through conduit 143, for the removal of the absorbed homologues. This operation is conducted at about 95° F. and about 3 p. s. i. g. which is slightly lower than the pressure of the previous stripping operation. Although the presence of water in the stripper greatly aids in the removal of the absorbed gases it is necessary in order to obtain a satisfactory recovery to use a much larger quantity of stripping gas in this operation than in the acetylene removal. In this specific example the quantity of nitrogen used is about 6 s. c. f. per pound of bottoms from tower 101. The gases desorbed in this operation comprise a mixture of diacetylene and acetone and include small amounts of the other acetylene homologues and some water vapor. The total gases are removed overhead from the stripper and passed through conduit 113 to a homologues water scrubber 179. The liquid absorbent now primarily a mixture of acetone and water is removed from the bottom of the tower through pump 115, passed through conduit 117 and exchanger 119 and is introduced into the bottom of an acetone regenerator 123. Within this tower a conventional distillation is carried out which provides substantial separation of the water and acetone. The heat requirements of this step, which is carried out at a substantially higher temperature are provided by a conventional reboiler 125. Acetone vapor containing about 1 percent water is removed overhead from the tower through conduit 127, passed through a conventional water condenser 129 and into an accumulator 131. This material is withdrawn from the accumulator through pump 133 with a portion being returned to the regenerator as reflux through conduit 135 and the remainder being further cooled in cooler 139 for use as reflux in the diacetylene absorber 15.

Returning now to the first step of the process, the gaseous effluent from the diacetylene absorber 15 comprises the major part of the acetylene product, now contaminated with a minor amount of acetylene homologues, and the other reaction and combustion gases previously mentioned. This material leaves the absorber through conduit 19 and is introduced into the bottom of an acetylene absorber 21 where it is contacted countercurrently with an additional quantity of acetone for the purpose of removing the acetylene. This operation is carried out at a temperature of about 60° F. and at about 190 p. s. i. g. The amount of acetone required is much larger than in the first absorption step, namely about 20 pounds per pound of acetylene removed. The overhead from the acetylene absorber 21 is passed through conduit 23 and introduced into the bottom of the tail gas water scrubber 187. Here this material is contacted with water from surge drum 87 through conduit 91 for the removal of acetone. This operation is carried out at a temperature of about 100° F. and at about 190 p. s. i. g. The gas from the water scrubber is divided into two streams, one of which is returned as stripping gas to the acetylene stripper 101 as previously described, and the other is removed from the unit. In composition, the tail gas comprises primarily gaseous hydrocarbons other than acetylene and its homologues, hydrogen and inert combustion gases.

The liquid absorbent which accumulates in the bottom of the acetylene absorber 21 is withdrawn therefrom through conduit 27 and is introduced into an intermediate section of a reabsorber 29. A further quantity of acetone solvent is introduced through conduit 171 into this vessel where gaseous hydrocarbons, other than acetylene and its homologues, and other inert materials, including hydrogen, carbon monoxide, carbon dioxide, etc., are removed by a stripping-reabsorbing operation. This process is carried out at a substantially reduced pressure, namely about 10 p. s. i. g., and at slightly higher temperature than the preceding absorption step. The heat required in the reabsorption tower is supplied by a conventional reboiler 33. The gases released in this operation pass overhead from the reabsorber through conduit 31 and are combined with the overhead gases from acetylene stripper 101, the mixture being introduced into the recycle gas water scrubber 97 as previously described. A mixture of acetone and acetylene containing only minor amounts of impurities leaves the bottom of the reabsorber through pump 35 and conduit 37, passes through exchanger 39 where it is heated and is introduced into an acetylene stripper 41 at an intermediate point thereof. The temperature in this tower is increased to about 170° F. at the bottom by the addition of heat from a conventional reboiler 25. As a result, a portion of the liquid feed vaporizes and flows through the stripper being contacted by downwardly flowing acetone introduced through conduit 75. Both acetylene and its homologues are released from the feed; however, the acetone reflux preferentially reabsorbs the homologues and the gas leaving the top of the stripper 41 through conduit 49 comprises essentially a mixture of acetone and acetylene. This material is introduced into a product water scrubber 51 wherein it is countercurrently scrubbed with water introduced through conduit 177. The final acetylene product is released from this vessel and conducted from the unit through conduit 53. The bottoms from the product water scrubber are transferred through pump 55 and conduit 57 into an acetone recovery still 61. Prior to their entry into the latter vessel, the bottoms are heated in exchanger 59. The operation of the acetone recovery still is essentially the same as the acetone regenerator 123 previously described. Here again, the water and acetone are almost completely separated with the latter being accumulated in a reflux drum 69 and the water being stored in surge drum 87.

It is still necessary to remove homologues from the material which accumulates in the bottom of the acetylene stripper 41. To accomplish this, the bottoms from this stripper are passed through heat exchanger 39 countercurrent to the stripper feed, through a water after cooler and a pump 47 and into a homologues stripper 141. In this vessel the bottoms are elevated in temperature by heat introduced from a conventional reboiler 147 and are stripped with nitrogen introduced through conduit 145. The quantity of stripping gas required in this operation is about 0.6 s. c. f. per pound of stripper feed. The stripping operation serves to separate a major portion of the homologues from the acetone solvent. The overhead gases from the homologue stripper, released through conduit 149, are combined with the overhead stream from the diacetylene stripper 111 and the total gas is introduced into a homologues water scrubber 179 for the removal of acetone therefrom. To effect this separation a quantity of water is introduced into an intermediate section of the tower through conduit 99. The overhead from the tower which comprises primarily homologues diluted with nitrogen is removed from the unit through conduit 181. The bottoms from this tower are introduced into the acetone recovery still 61 through conduit 175.

The material leaving the bottom of the acetylene stripper 41 contains a certain amount of inert gases carried over from the reabsorber. Operation of the homologues stripper 141 in a conventional manner has failed to remove these gases from the absorbent and as a result they have been returned to the acetylene stripper in the circulating acetone where they are released to contaminate the acetylene product. This problem has been solved, as illustrated in the accompanying drawing by adding an acetone stripping section below in nitrogen gas inlet of the stripper 141, wherein inerts are eliminated by countercurrent contact of the downflowing acetone with vapors from reboiler 147.

As can be readily seen, the operation illustrated in the accompanying drawing is rather complex particularly as relating to the acetone recovery systems, which are several in number. The particular procedures used in supplying this absorbing medium to the various vessels in the process are, of course, only illustrative in nature and other arrangements, readily apparent to those skilled in the art may be used within the scope of the invention. Similarly, the particular arrangement of the processing steps shown and described may be altered and still provide substantially the same results, particularly in that part of the process which is not concerned with the separation of the major contaminant, diacetylene. Although it is not shown in the drawing, the cooling of the various absorbent streams is readily effected by the use of a conventional refrigeration system. The specific embodiment of the invention presented herein is directed to the operation of a system wherein diacetylene is the major contaminant. With different reaction conditions the pyrolysis product gases may contain only a minor portion of this material. In such a case, appropriate changes in operating conditions will provide an improved homologue separation process utilizing the method of this invention. As illustrated, a simple distillation step is sufficient to separate water from the absorbent when acetone is selected as the solvent; however, the use of other absorbents may require a more complicated purification treatment particularly if an azeotrope having a high water concentration is formed. In such a case, the removal of water may involve the use of an entraining agent or the use of extractive distillation, or even more complicated recovery methods to break the azeotrope.

A typical application of this embodiment of the invention on a commercial scale is illustrated by the following data.

Example

| | Flows, lb./hr. |
|---|---|
| Diacetylene absorber: | |
|   Feed | 48,150 |
|   Reflux (acetone) | 9,700 |
|   Overhead | 48,350 |
|   Bottoms | 9,500 |
| Acetylene stripper "A" | |
|   Overhead | 1,550 |
|   Stripping Gas | 350 |
|   Bottoms | 8,300 |
| Recycle gas water scrubber: | |
|   Reflux (water) | 36,750 |
|   Feed | 8,000 |
|   Overhead | 6,600 |
|   Bottoms | 38,150 |
| Diacetylene stripper: | |
|   Water (added to feed) | 14,450 |
|   Overhead | 6,100 |
|   Bottoms | 19,700 |
|   Stripping gas (nitrogen) | 3,050 |
| Acetone regenerator: | |
|   Reflux (acetone) | 15,900 |
|   Overhead | 25,600 |
| Acetylene absorber: | |
|   Reflux (acetone) | 207,500 |
|   Overhead | 34,800 |
|   Bottoms | 225,000 |
| Reabsorber: | |
|   Reflux (acetone) | 154,000 |
|   Bottoms | 368,500 |
| Acetylene stripper "B": | |
|   Reflux (acetone) | 136,400 |
|   Overhead | 11,550 |
|   Bottoms | 498,600 |
| Homologue stripper: | |
|   Stripping Gas (nitrogen) | 22,800 |
|   Overhead | 55,200 |
|   Bottoms | 466,200 |
| Product water scrubber: | |
|   Reflux (water) | 47,300 |
|   Bottoms | 50,100 |
| Acetone recovery still: | |
|   Top reflux (acetone) | 90,640 |
|   Intermediate reflux (acetone) | 16,200 |
|   Bottoms | 370,000 |
|   Overhead | 142,900 |
| Homologues water scrubber: | |
|   Reflux | 247,000 |
|   Bottoms | 341,450 |

| Tail gas water scrubber: | Flows, lb./hr. |
|---|---|
| Reflux (water) | 36,360 |
| Bottoms | 37,950 |
| Acetylene product | 8,750 |
| Homologues product | 28,550 |
| Tail gas product | 32,750 |

| Diacetylene absorber: | Temperatures,[1] °F. |
|---|---|
| Feed | 55 |
| Top | 50 |
| Bottom | 45 |
| Reflux | 50 |
| Acetylene stripper "A": | |
| Top | 45 |
| Bottom | 50 |
| Diacetylene stripper: | |
| Feed | 97 |
| Top | 95 |
| Bottom | 70 |
| Acetone regenerator | 142 |
| Acetylene absorber | 52 |
| Reabsorber | 61 |
| Acetylene stripper "B" | 72 |
| Homologue stripper | 100 |
| Acetone regenerator | 142 |
| Product water scrubber | 110 |
| Acetone recovery still | 150 |
| Homologues water scrubber | 110 |
| Tail gas water scrubber | 110 |
| Water reflux surge drum | 110 |
| Acetone recovery still reflux drum | 110 |
| Acetone surge drum | 110 |
| Acetone regenerator reflux drum | 110 |
| Nitrogen stripping gas | 100 |

[1] Top tower temperatures unless otherwise indicated.

| | Pressures, p. s. i. g. |
|---|---|
| Diacetylene absorber | 197 |
| Acetylene stripper "A" | 10 |
| Recycle gas water scrubber | 5 |
| Diacetylene stripper | 3 |
| Acetone regenerator | 2 |
| Acetylene absorber | 192 |
| Reabsorber | 9 |
| Acetylene stripper "B" | 9 |
| Homologue stripper | 3 |
| Product water scrubber | 7 |
| Acetone recovery still | 5 |
| Homologues water scrubber | 0 |
| Tail gas water scrubber | 188 |
| Water reflux surge drum | 0 |
| Acetone recovery still reflux drum | 0 |
| Acetone surge drum | 1 |
| Acetone regenerator reflux drum | 0 |

COMPOSITION OF STREAMS (MOL PERCENT)

| | $C_2H_2$ | $CH_4$ | $C_2H_4$ | $C_3H_4$ | $C_4H_2$ | $C_4H_4$ | $CO_2$ | $O_2$ | $CO$ | $N_2$ | $H_2$ | Acetone | $H_2O$ |
|---|---|---|---|---|---|---|---|---|---|---|---|---|---|
| Diacetylene Absorber: | | | | | | | | | | | | | |
| Feed | 12.25 | 5.59 | 0.34 | 0.15 | 0.33 | 0.05 | 3.86 | 0.33 | 22.11 | 0.14 | 54.85 | 0.004 | |
| Bottoms | 15.20 | 0.13 | 0.06 | 0.69 | 6.11 | 0.62 | 7.28 | | | 0.19 | | 0.20 | 69.35 | 6.17 |
| Acetylene Stripper "A": | | | | | | | | | | | | | |
| Overhead | 41.86 | 2.73 | 0.31 | 0.71 | 0.52 | 0.28 | 4.51 | 0.17 | 11.95 | 0.07 | 20.11 | 7.62 | 0.07 |
| Bottoms | 0.16 | | | 0.54 | 7.40 | 0.66 | 0.08 | | | 0.09 | | | 83.26 | 7.81 |
| Diacetylene Stripper: | | | | | | | | | | | | | |
| Overhead | 0.14 | | | 0.48 | 6.56 | 0.58 | 0.07 | 1.96 | 0.03 | 63.25 | | 21.36 | 5.57 |

Having thus described the invention by reference to a specific application thereof, it is understood that no undue limitations or restrictions are to be imposed by reason thereof but that the scope of the invention is defined by the appended claims.

I claim:

1. In a process for the preparation of acetylene by the pyrolysis of hydrocarbons in which the gaseous reaction product contains impurities of a polymerizable nature the method of separating said impurities from the gases with a minimum of polymerization which comprises contacting the product gases in an absorption zone with a solvent under suitable conditions to absorb the impurities and a minimum proportion of the acetylene from said gases, contacting the bottoms from the absorption zone with between about 0.5 and about 2.0 mols of an inert gas per mol of absorbed gas in a first stripping zone for the removal of absorbed acetylene and further contacting the absorbent in the presence of water with between about 5 and about 20 mols of inert gas per mol of absorbed gas in a second stripping zone at a temperature below the boiling point of water to remove the impurities contained therein.

2. The process of claim 1 in which the polymerizable impurities comprise homologues of acetylene.

3. The process of claim 1 in which the polymerizable impurities comprise homologues of acetylene and primarily diacetylene.

4. In a process for the preparation of acetylene by the pyrolysis of hydrocarbons in which the gaseous reaction product contains impurities of a polymerizable nature the method of separating said impurities from the gases with a minimum of polymerization which comprises contacting the product gases in an absorption zone with a solvent under suitable conditions to absorb the impurities and a minimum proportion of the acetylene from said gases, contacting the bottoms from the absorption zone with an inert gas in a first stripping zone for the removal of absorbed acetylene and further contacting the absorbent in the presence of water in a second stripping zone at a temperature below the boiling point of water with an amount of inert gas large in comparison with the quantity of said gas used in the first stripping zone to remove the impurities contained therein.

5. In a process for the pyrolysis of hydrocarbons wherein the reaction product comprises a mixture of acetylene, acetylene homologues and other gaseous hydrocarbons and inert gas, the method of separating the acetylene homologues from the remainder of the gaseous product which comprises introducing the product gas into an absorption zone wherein the homologues and a minor portion of the acetylene are absorbed therefrom in a solvent, passing the bottoms from the absorption zone to a first stripping zone wherein they are contacted with between about 0.5 and about 2.0 mols of an inert stripping gas per mol of absorbed gas for the removal of absorbed acetylene, diluting the bottoms from the first stripping zone with water to increase the volatility of the acetylene homologues and passing the diluted absorbent to a second stripping zone at a temperature below the boiling point of water wherein it is contacted with between about 5 and about 20 mols of an inert stripping gas per mol of absorbed gas to remove the acetylene homologues.

6. In a process for the pyrolysis of hydrocarbons wherein the reaction product comprises a mixture of acetylene, acetylene homologues and other gaseous hydrocarbons and inert gas, the method of separating the acetylene homologues from the remainder of the gaseous product which comprises introducing the product gas into an absorption zone wherein the homologues and a minor portion of the acetylene are absorbed therefrom in a solvent, passing the bottoms from the absorption zone to a first stripping zone wherein they are contacted with an inert stripping gas for the removal of absorbed acetylene, diluting the bottoms from the first stripping zone with water to increase the volatility of the acetylene homologues and passing the diluted absorbent to a second stripping zone at a temperature below the boiling point of water wherein it is contacted with a quantity of inert stripping gas large in comparison to the amount used in the first stripping zone to remove the acetylene homologues.

7. The process of claim 5 in which the acetylene homologues comprise a mixture of methyl acetylene, monovinyl acetylene and primarily diacetylene.

8. In a process for the pyrolysis of hydrocarbons wherein the reaction product comprises a mixture of acetylene, diacetylene, minor amounts of other acetylene homologues, and other gaseous hydrocarbons and inert gases, the method of separating the diacetylene from the remainder of the gaseous product which comprises introducing the product gas into an absorption zone wherein the homologues and a minor portion of the diacetylene are absorbed therefrom in a solvent, passing the bottoms from the absorption zone to a first stripping zone wherein they are contacted with between about 0.5 and about 2.0 mols of an inert stripping gas per mol of absorbed gas for the removal of absorbed acetylene, diluting the bottoms from the first stripping zone with water to increase the volatility of the diacetylene and passing the diluted absorbent to a second stripping zone at a temperature below the boiling point of water wherein it is contacted with between about 5 and about 20 mols of an inert stripping gas per mol of absorbed gas to remove the diacetylene.

9. In a process for the pyrolysis of hydrocarbons wherein the reaction product comprises a mixture of acetylene, diacetylene, minor amounts of other acetylene homologues and other gaseous hydrocarbons and inert gas, the method of separating the diacetylene from the remainder of the gaseous product which comprises introducing the product gas into an absorption zone wherein the homologues and a minor portion of the diacetylene are absorbed therefrom in a solvent, passing the bottoms from the absorption zone to a first stripping zone wherein they are contacted with an inert stripping gas for the removal of absorbed acetylene, diluting the bottoms from the first stripping zone with water to increase the volatility of the diacetylene and passing the diluted absorbent to a second stripping zone at a temperature below the boiling point of water wherein it is contacted with a quantity of inert stripping gas large in comparison to the amount used in the first stripping zone to remove the diacetylene.

10. In a process for the pyrolysis of hydrocarbons wherein the reaction product comprises a mixture of acetylene, diacetylene, minor amounts of other acetylene homologues, and other gaseous hydrocarbons and inert gas, the method of separating the diacetylene from the remainder of the gaseous product which comprises introducing the product gas into an absorption zone wherein the homologues and a minor portion of the diacetylene are absorbed therefrom in a solvent, said absorption zone being maintained at a temperature between about 40 and 100° F. and a pressure between about 100 and 300 p. s. i. g., passing the bottoms from the absorption zone to a first stripping zone wherein they are contacted with between about 0.5 and about 2.0 mols of an inert stripping gas per mol of absorbed gas for the removal of absorbed acetylene, diluting the bottoms from the first stripping zone with water to increase the volatility of the diacetylene, passing the diluted absorbent to a second stripping zone maintained at a temperature below the boiling point of water wherein it is contacted with between about 5 and about 20 mols of an inert stripping gas per mol of absorbed gas to remove the diacetylene, introducing the bottoms from this zone into a separating zone wherein water is removed from solvent and returning the solvent to the absorption zone.

11. In a process for the pyrolysis of hydrocarbons wherein the reaction product comprises a mixture of acetylene, diacetylene, minor amounts of other acetylene homologues, and other gaseous hydrocarbons and inert gases, the method of separating the diacetylene from the remainder of the gaseous product which comprises introducing the product gas into an absorption zone wherein the homologues and a minor portion of the diacetylene are absorbed therefrom in a solvent, said absorption zone being maintained at a temperature between about 40 and about 100° F. and a pressure between about 100 and 300 p. s. i. g., passing the bottoms from the absorption zone to a first stripping zone wherein they are contacted with an inert stripping gas for the removal of absorbed acetylene, diluting the bottoms from the first stripping zone with water to increase the volatility of the diacetylene, passing the diluted absorbent to a second stripping zone at a temperature below the boiling point of water wherein it is contacted with a quantity of inert stripping gas large in comparison to the amount used in the first stripping zone to remove the diacetylene, introducing the bottoms from this zone into a separating zone wherein water is removed from the solvent and returning the solvent to the absorption zone.

References Cited in the file of this patent

UNITED STATES PATENTS

| 1,988,032 | Baumann | Jan. 15, 1935 |
| 2,250,925 | Babcock | July 29, 1941 |
| 2,642,154 | Woolcock | June 16, 1953 |
| 2,714,940 | Milligan | Aug. 9, 1955 |
| 2,741,332 | Finneran et al. | Apr. 10, 1956 |

FOREIGN PATENTS

| 712,535 | British | July 28, 1954 |
| 712,544 | British | July 28, 1954 |